United States Patent [19]
Ohkura et al.

[11] Patent Number: 6,014,525
[45] Date of Patent: Jan. 11, 2000

[54] PHOTOMETRIC DEVICE

[75] Inventors: Tadahisa Ohkura, Saitama; Isamu Hirai, Tokyo, both of Japan

[73] Assignee: Asahi Kogaku Kogyo Kabushiki Kaisha, Tokyo, Japan

[21] Appl. No.: 09/203,477

[22] Filed: Dec. 2, 1998

[30] Foreign Application Priority Data

Dec. 3, 1997 [JP] Japan .................................. 9-333270
Oct. 1, 1998 [JP] Japan .................................. 10-279991

[51] Int. Cl.[7] .................................................. G03B 7/08
[52] U.S. Cl. .......................................................... 396/234
[58] Field of Search ................................... 396/234, 233, 396/213; 356/222, 218, 213

[56] References Cited

U.S. PATENT DOCUMENTS 5,289,225  2/1994  Hirai ........................................ 396/122
5,543,837  8/1996  Aoki et al. .............................. 348/264

*Primary Examiner*—W. B. Perkey
*Attorney, Agent, or Firm*—Greenblum & Bernstein, P.L.C.

[57] ABSTRACT

A photometric device includes split photometric sensors for photometrically measuring a plurality of different split regions of a subject image formed by photometric optical systems. The split photometric regions of each split photometric sensor are formed in such a manner as to partially overlap with the split photometric regions of the other split photometric sensor. The photometric optical systems defocuses the images so that the combined photometric sensitivity distribution changes smoothly from the center of the subject region toward a periphery thereof.

7 Claims, 6 Drawing Sheets

PHOTOMETRIC DEVICE

BACKGROUND OF THE INVENTION

1. Field of the Invention

The present invention relates to a photometric device having split photometric sensors.

The present application is based on Japanese Application Nos. Hei. 9-333270 and 10-279991, which are incorporated herein by reference.

2. Description of the Related Art

It is known to provide a camera with a photometric device. A light receiving surface of the photometric sensor is disposed on or near an expected focal plane of a subject image, so that the sensor measures the brightness of the subject image formed on the light receiving surface. Further, some photometric devices have split photometric sensors in which the light receiving surface is divided into a plurality of regions. The brightness of the subject image incident upon each split photometric region can be measured.

The light receiving surface of the split photometric sensor is divided into the split photometric regions of the desired shapes, and the split photometric regions are separated from each other by an insensitive region so as to prevent crosstalk or locate the wirings. FIG. 7 shows an example of a split photometric sensor 71. This split photometric sensor 71 has six-split sensor regions 73A to 73F. These sensor regions 73A to 73F are separated by an insensitive region 75.

Accordingly, it is not possible to measure the luminance and thus brightness of the subject image formed on the insensitive region 75. FIG. 7 three-dimensionally illustrates the sensitivity distribution of this split photometric sensor 71. In a three-dimensional sensitivity distribution 70, the higher the ridge, the higher the sensitivity. As is apparent from the photometric sensitivity distribution 70, the insensitive region 75 portion becomes a trough, and the distribution is discontinuous from the center toward the periphery. In the drawing, reference numeral 41 denotes a photographing image plane.

If the width of the insensitive region 75 is made narrow, the crosstalk increases, to lower the accuracy of split photometry. In other words, the more compact the split photometric sensor 71 is made, and the more the number of split photometric regions is increased, the greater the proportion of the insensitive region 75 to the photometric region becomes, and thus the larger the unevenness in photometric sensitivity becomes.

SUMMARY OF THE INVENTION

The object of the present invention is to provide a split photometric device which makes it possible to obtain a photometric sensitivity distribution which is gently sloped from the center of the photographing image plane toward a peripheral portion thereof.

To attain the above object, a photometric device according to the present invention is characterized by a plurality of split photometric sensors each having split photometric regions separated by a nonsensitive portion; and photometric optical systems for forming subject images on the split photometric sensors. The split photometric regions and the photometric optical systems are formed such that the subject image formed on the split photometric regions of one sensor is partially overlapped with the subject image formed on the split photometric regions of another sensor. A combined photometric sensitivity distribution of the split photometric sensors changes smoothly from a center of a subject region toward a periphery thereof.

DETAILED DESCRIPTION OF THE PREFERRED EMBODIMENTS

Figure 1:
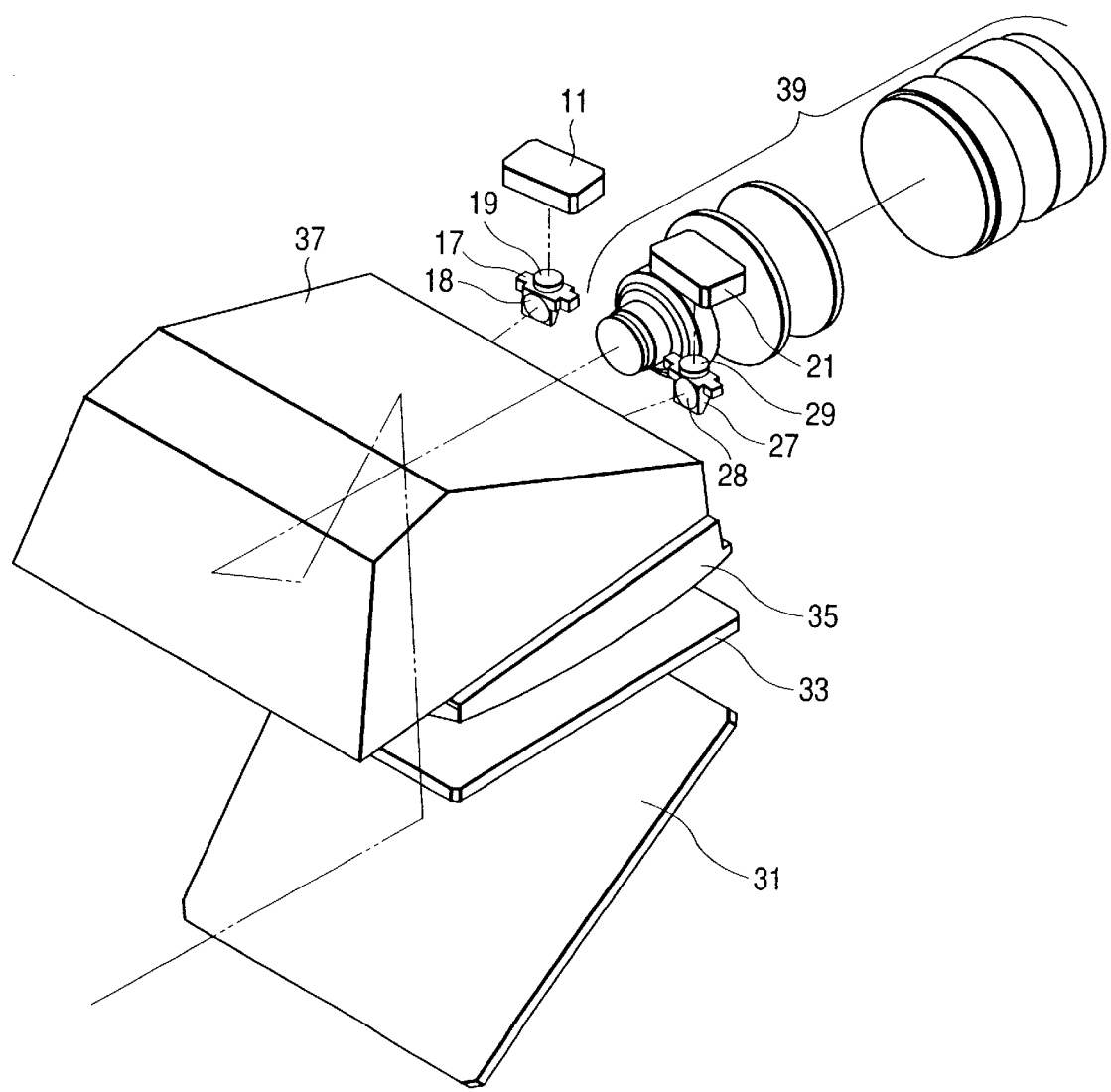
FIG. 1 is an exploded perspective view of an embodiment in which a photometric device of the present invention is applied to a single reflex lens.

Referring now to the drawings, a description will be given of a novel photometric device. The illustrated photometric device is characterized in that a pair of split photometric sensors 11 and 21 are provided, and that these split photometric sensors 11 and 21 are respectively provided with photometric optical systems for forming subject images at different magnifications.

FIG. 1 is an exploded perspective view illustrating the configuration of the photometric device and its peripheral parts in a single reflex camera. A subject bundle of rays incident through an unillustrated photographing lens is reflected by a main mirror 31, and transmitted through a focusing screen 33 (disposed. at an equivalent position to a film plane) and a condenser lens 35 to a prism 37 which converts an inverted image to an erected image. The subject bundle of rays is reflected inside the prism 37 and emergent from the prism 37 so that the most of the subject bundle of ray is transmitted through a finder magnifying glass (eyepiece) 39 to a photographer's eye.

The pair of first and second split photometric sensors 11 and 21, which form a photometric system, are respectively disposed on both sides of the finder magnifying glass 39. The split photometric sensors 11 and 21 are provided with photometric optical systems 17 and 27 for guiding the subject bundle of rays emergent from the prism 37 to light receiving portions of the split photometric sensors 11 and 21 so as to form images on these portions. The photometric optical systems 17 and 27 respectively include first photometric lenses 18 and 28, mirrors (not shown) for deflecting photometric opticalpaths 90° to extend in the upper direction of the camera, and second photometric lenses 19 and 29 serving as image forming lenses. These components are arranged in that order from the prism 37 side.

Figure 2:
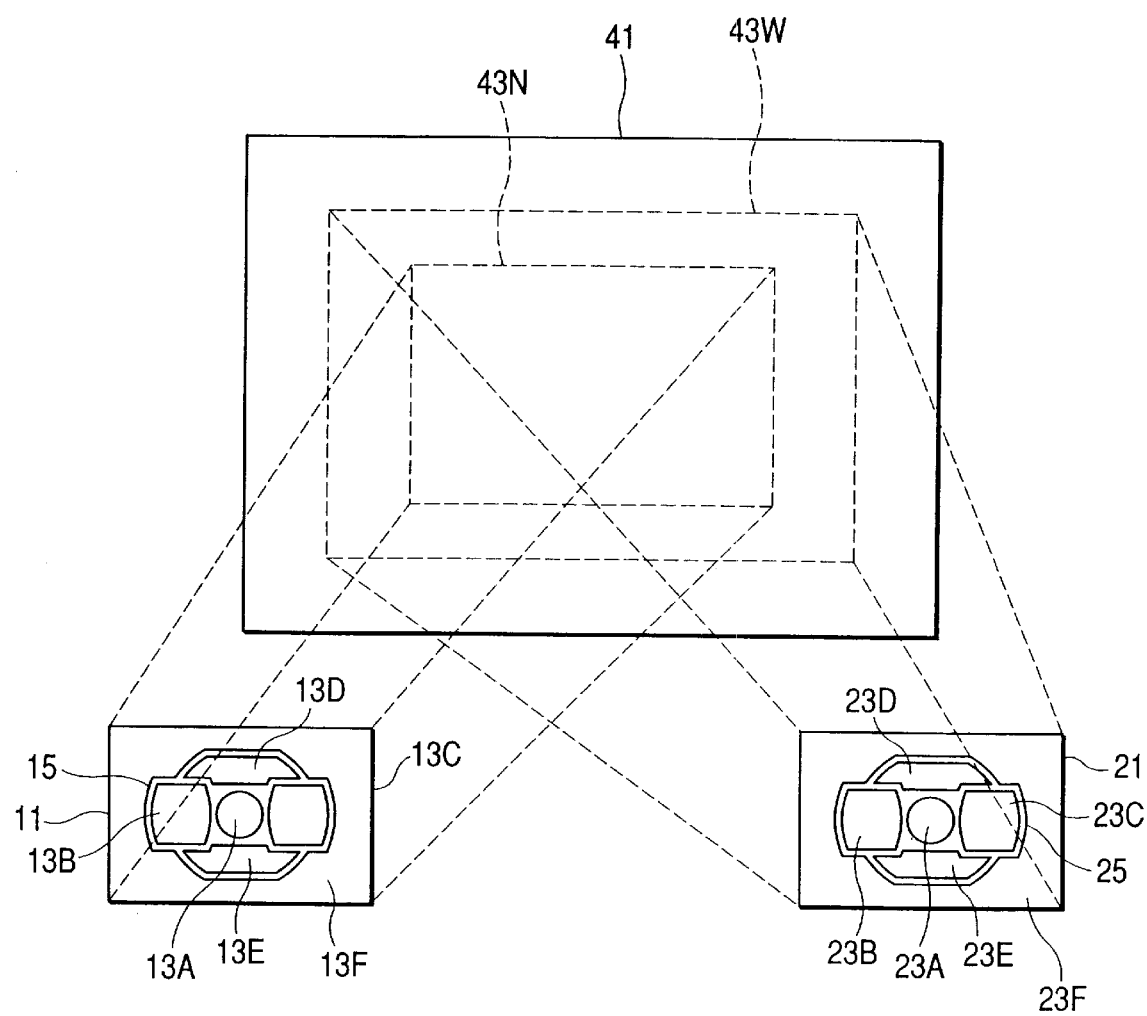
FIG. 2 is a diagram illustrating the relationship between a photographic image plane and photographic regions of a pair of split photometric sensors of the photometric device.

As shown in FIG. 2, the split photometric sensors 11 and 21 have the same structures, which are formed with split photometric regions of the identical shapes. Each of the split photometric sensors 11 and 21 has six-split photometric (sensor) regions on a light receiving surface and an insensitive region 15, 25 for separating these photometric regions. More specifically, the first split photometric sensor 11 has a central photometric region 13A, a pair of left and right photometric regions 13B and 13C located on the left- and right-hand sides of the central photometric region 13A, a pair of upper and lower photometric regions 13D and 13E located on upper and lower sides of the central photometric region 13A, a peripheral photometric region 13F surrounding these regions 13B, 13C, 13D and 13E, and an insensitive region 13F for separating these photometric regions 13A to 13F. The second split photometric sensor 21 is identical in structure to the first split photometric sensor 11, which is provided with split photometric regions 23A to 23F and the insensitive region 25, identical in shape to the split photometric regions 13A to 13F and the insensitive region 15.

Among the subject images formed in the split photometric sensors 11 and 21, the brightness of portions formed on the split photometric regions 13A to 13F and 23A to 23F can be photometrically measured, but the brightness of portions formed on the insensitive regions 15 and 25 cannot be photometrically measured. A narrow (small) frame 43N is set on a photographing image plane 41 to be photometrically sensed by the split photometric sensor 11, whereas a wide (large) frame 43W is set on the photographing image plane 41 to be photometrically sensed by the photometric sensor 21.

FIG. 2 shows the relationship between a photographing image plane (entirety of the subject image) 41 and the narrow and wide frames 43N and 43W to be sensed by the split photometric sensors 11 and 21. A subject image within the relatively narrow frame 43N within the photographing image plane 41 is formed on the light receiving surface of the first split photometric sensor 11, whereas a subject image within the relatively wide frame 43W (larger in area than the narrow frame 43N) is formed on the light receiving surface of the second split photometric sensor 21. The image within the wide frame 43W is projected onto the second split photometric sensor 21 in a more reduced form than the image within the narrow frame 43N is projected onto the first split photometric sensor 11. In other words, the high-magnification subject image is formed on the first split photometric sensor 11, whereas the low-magnification subject image is formed on the second split photometric sensor 21. For this reason, the magnification of the photometric optical system 17 is set to be higher than the magnification of the photometric optical system 27, or the focal length of the photometric optical system 17 is set to be longer than the focal length of the photometric optical system 27.

Figure 3:
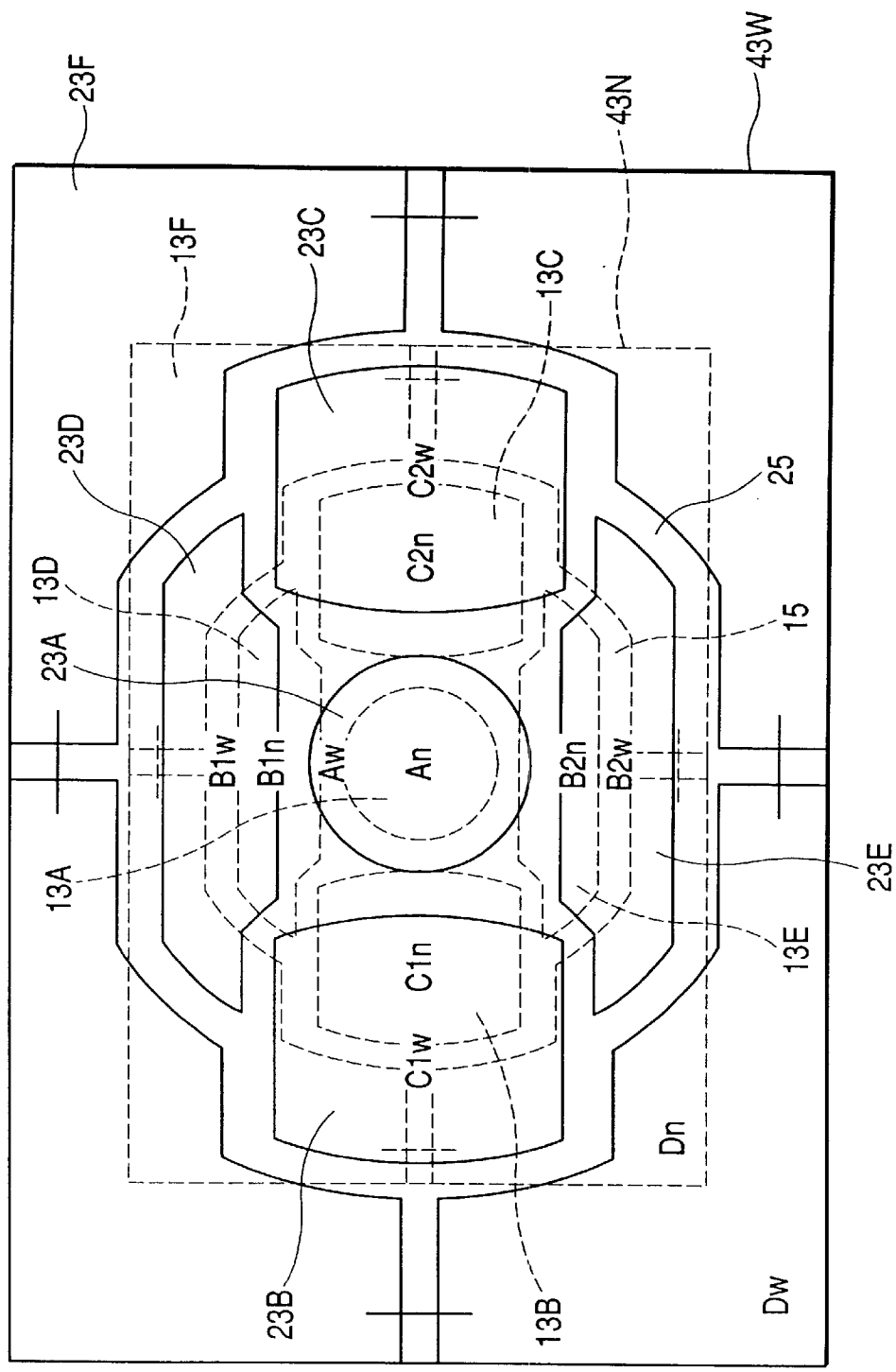
FIG. 3 is a diagram in which a subject image region and photometric regions and dead zone regions of the pair of split photometric sensors of the photometric device are illustrated in an overlapped state.

FIG. 3 is a diagram illustrating the relationship between the narrow and wide frames 43N and 43W and the split photometric regions 13A to 13F and 23A to 23F of the split photometric sensors 11 and 21. In the diagram, the split photometric regions on the on the split photometric sensors 11 and 21 are shown with certain magnifications in conformity with a ratio between areas of the narrow and wide frames 43N and 43W on the photographing image plane 41. As can be seen from this diagram, portion corresponding to insensitive region 25, which cannot be photometrically measured by the second split photometric sensor 21, is almost entirely overlapped and covered by the split photometric regions 13A to 13F of the first split photometric sensor 11, while portion corresponding to the insensitive region 15, which cannot be photometrically measured by the first split photometric sensor 11, is almost entirely overlapped and covered by the split photometric regions 23A to 23F of the second split photometric sensor 21.

Figure 5A:
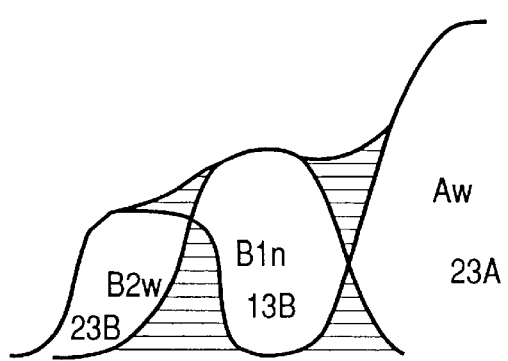
FIG. 5 is a two-dimensional graph of the photometric sensitivity distribution of the photometric device.
Figure 5B:
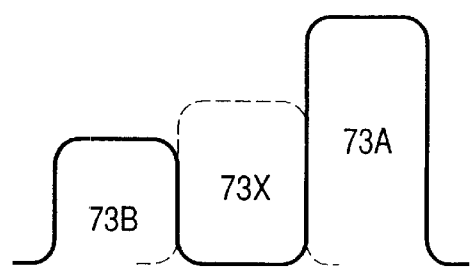

However, simply covering the insensitive region of one sensor by the split photometric regions of the other sensor may cause photometric sensitivity distribution not to continue smoothly from photometric regions 73A and 73B of the sensor to a new photometric region 73X of the other sensor as shown in FIG. 5(B). That is, the sensitivity may excessively drop or rise at boundary portions, and unevenness in sensitivity may occur.

Figure 4:
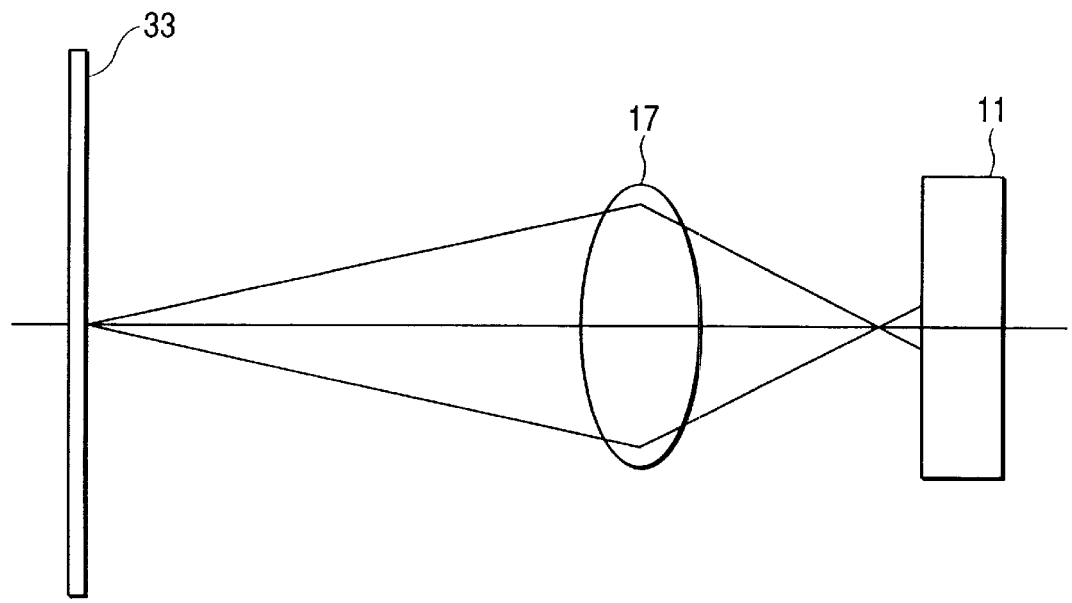
FIG. 4 is a diagram illustrating the relationship between the split photometric sensors and an image on a focusing screen of the photometric device.

To ensure that a photometric characteristic continuing smoothly from the center of wide frame 43W to the periphery thereof, the photometric optical systems 17 and 27 are set in a defocused state. FIG. 4 shows the relationship among the focusing screen 33, the split photometric sensor 11, and the photometric optical system 17 for transmitting an image on the focusing screen 33 to the split photometric sensor 11. As shown, the image on the focusing screen 33 is focused at a position in front of the split photometric sensor 11 (21). That is, the defocused state is obtained by moving the photometric optical system 17 to locate the image plane at the position in front of the split photometric sensor 11 (21), or moving the split photometric sensor 11 (21) away from the photometric optical system 17 and the position of the image plane. Since the image on the focusing screen 33 is focused at the position in front of the split photometric sensor 11, a defocused image is formed on the split photometric sensor 11. In the photometric device under discussion, the degree of defocusing is adjusted so that the subject image formed on the split photometric regions of the one of photometric sensors 11 and 21 overlap with the subject image formed on the other of the photometric sensors 11 and 21, whereby a photometric characteristic continues smoothly from the center of the entire area to be sensed (i.e., the wide frame 43W) to the periphery thereof. As shown in FIG. 5(A), the sensitivity distribution of photometric regions continue smoothly. It should be noted that the positional relationship between the image plane and the split photometric sensor 11, 21 is not limited to the illustrated example and it is possible to adopt an arrangement in which the image planes are located farther than the split photometric sensors 11, 21 respectively.

In addition, since the sensitivity distribution in the photometric device under discussion is obtained using center-emphasized photometric processing, the photometric sensitivity is high at the center and falls gently toward the periphery. An example of an arithmetic expression of center-emphasized photometry is as follows:

$$ans=(a \times Bv\alpha n + b \times Bv\beta n + c \times Bv\gamma n + d \times Bv\alpha w + e \times Bv\beta w + f \times Bv\gamma w)/(a+b+c+d+e+f)$$

The reference characters a, b, c, d, e, and f denote predetermined coefficients (weighting), photometric values of the photometric regions 13A to 13F in the narrow visual field are An, B1n, B2n, C1n, C2n, and Dn, and photometric values of the photometric regions 23A to 23F in the wide visual field are Aw, B1w, B2w, C1w, C2w, and Dw.

$Bv\alpha n$: photometric value of a central photometric region in the narrow visual field: An $Bv\beta n$: photometric value of an intermediate photometric region in the narrow visual field: (B1n+B2n+C1n+C2n)/4

$Bv\gamma n$: photometric value of a peripheral photometric region in the narrow visual field: Dn $Bv\alpha w$: photometric value of a central photometric region in the wide visual field: Aw $Bv\beta w$.: photometric value of an intermediate photometric region in the wide visual field: (B1w+B2w+C1w+C2w)/4

$Bv\gamma w$: photometric value of a peripheral photometric region in the wide visual field: Dw where α denotes a central region, β denotes an intermediate region surrounding the central region α, and γ denotes a peripheral region surrounding the intermediate region β.

The relationship among a, b, c, d, e, and f in terms of their magnitude is $$a>d>b>e>c>f$$

This center-emphasized photometric processing is characterized in that the photometric regions of each of the first and second split photometric sensors 11 and 21 are classified into three zone arranged consecutively from the center toward the periphery, and that the heaviest weight is applied on the central photometric zone, and lesser weight on the photometric zone located farther away from it. The photometric regions of the narrow visual field sensor 11 are classified such that the central photometric region 13A belongs to αn zone, the left and right photometric regions 13B and 13C and the upper and lower photometric regions 13D and 13E belongs to βn zone, and the peripheral photometric region 13F belongs to γn zone. Similarly, the photometric regions of the wide visual field sensor 21 are classified such that the central photometric region 23A belongs to αw zone, the left and right photometric regions 23B and 23C and the upper and lower photometric regions 23D and 23E belongs to βw zone, and the peripheral photometric region 23F belongs to γw zone. In terms of their sizes (photometric areas), these zones, if arranged in the ascending order, are (central photometric region 13A), (central photometric region 23A), (left and right photometric regions 13B and 13C and upper and lower photometric regions 13D and 13E), (left and right photometric regions 23B and 23C and upper and lower photometric regions 23D and 23E), (peripheral photometric region 13F), and (peripheral photometric region 23F).

Figure 6:
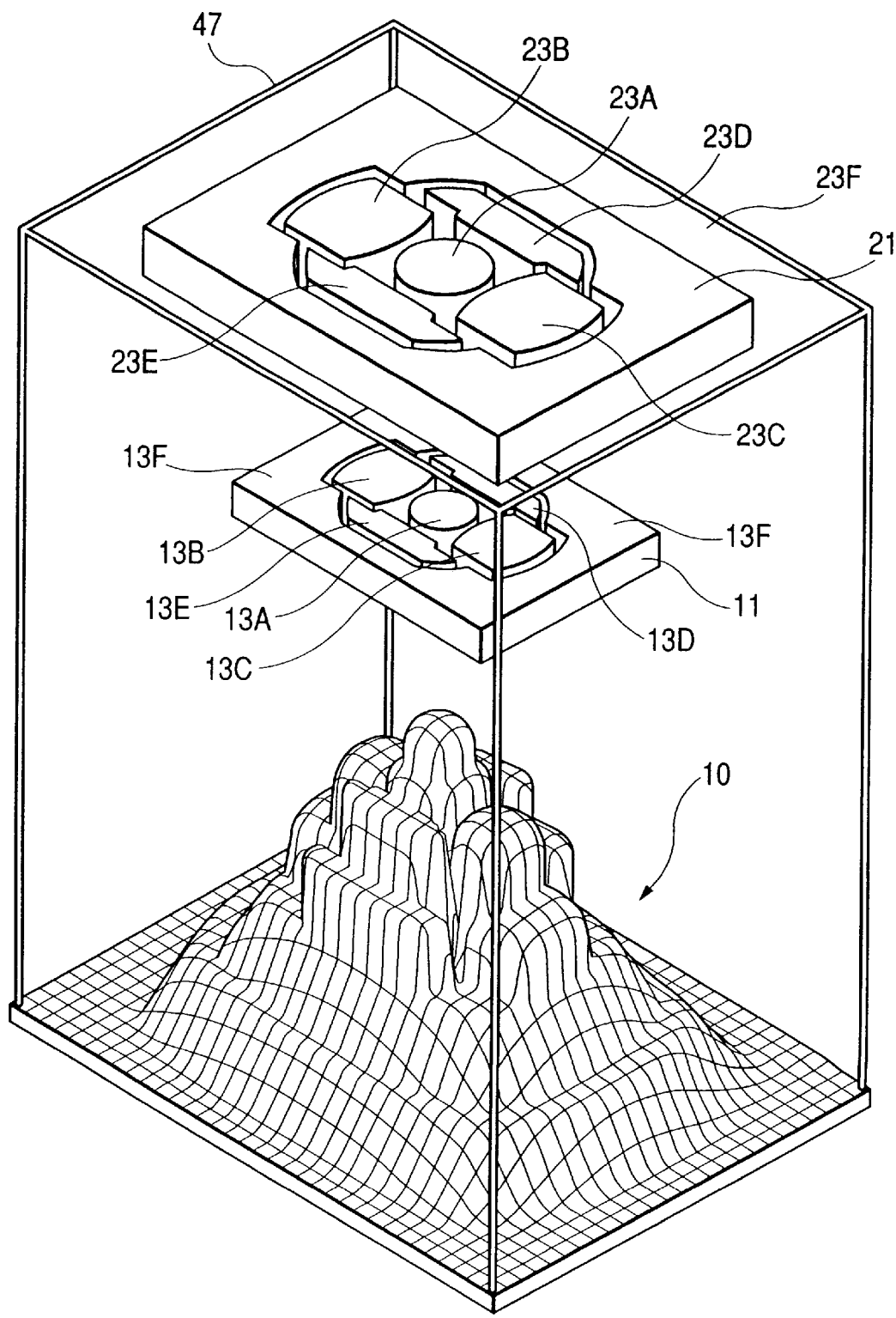
FIG. 6 is a graph three-dimensionally illustrating the photometric sensitivity distribution and the form of photometric regions of the pair of split photometric sensors of the photometric device.
Figure 7:
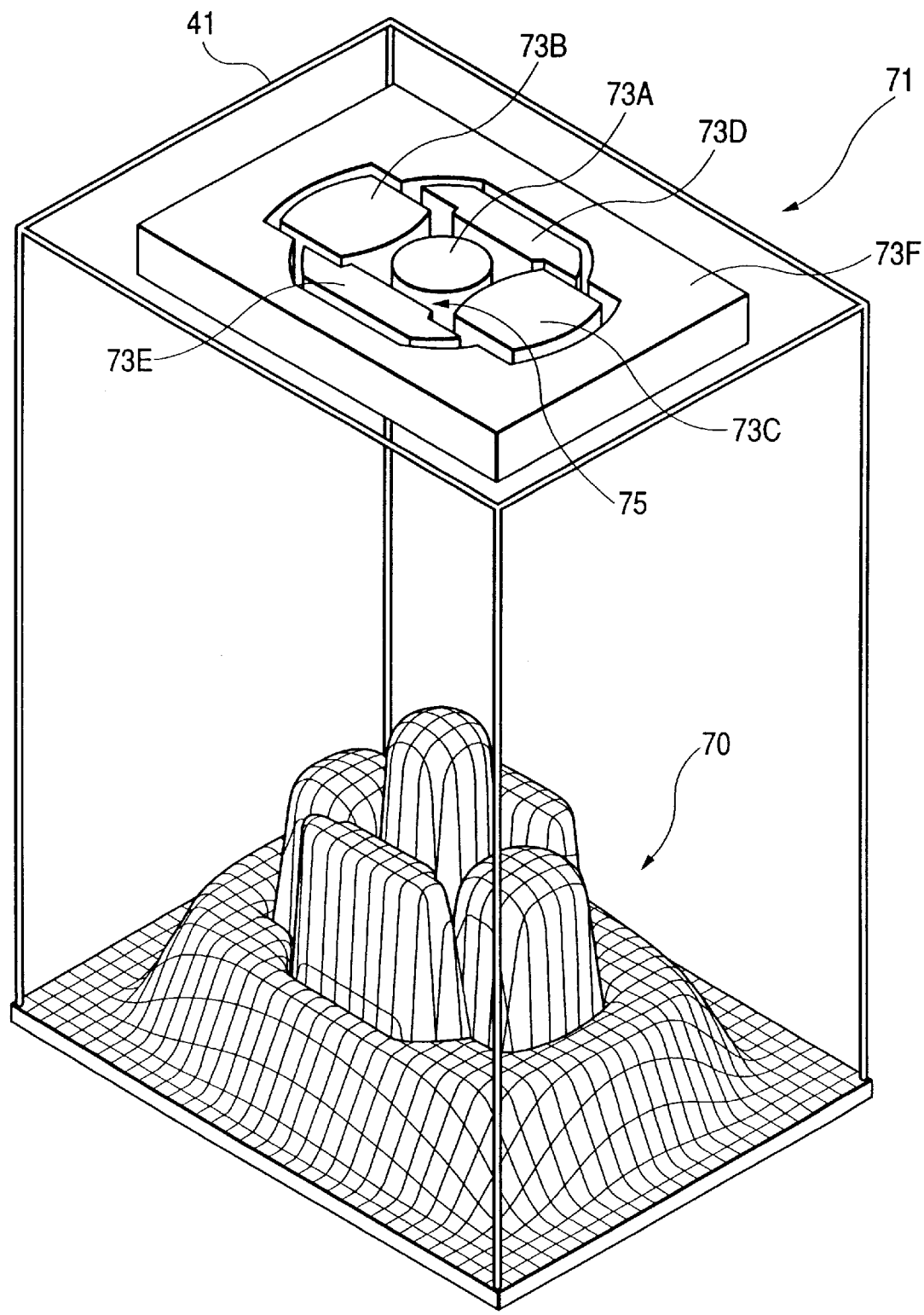
FIG. 7 is a graph three-dimensionally illustrating the photometric sensitivity distribution and the form of photometric regions of a split photometric sensor of a conventional split photometric device.

Sensitivity distributions obtained by these split photometric sensors are shown in FIGS. 5(A) and 6. FIG. 5(A) shows a two-dimensional sensitivity distribution in the horizontal direction on and around the central position of the area to be sensed, and FIG. 6 shows a three-dimensional sensitivity distribution over the entire area. As can be seen from these sensitivity distribution diagrams, it is possible to realize a center-emphasized sensitivity distribution in which the photometric sensitivity falls gently from the center toward the periphery.

As described above, the subject image photometrically sensed by the split photometric regions 13A to 13F and 23A to 23F of the split photometric sensors 11 and 21 partially overlap with each other, and the combined photometric sensitivity of the split photometric sensors 11 and 21 is obtained to continue gently from the center of the wide photometric frame 43W toward the periphery thereof. Consequently, uniform photometry is possible over the entire plane of the wide photometric frame 43W. Even if a subject of high brightness is present in a portion of the insensitive region of one split photometric sensor, reliable photometry is possible with respect to the subject of high brightness. Thus, appropriate photometric values can be obtained for the entire photographing image plane.

As described above, the arrangement provided in the photometric device under discussion is such that, by using a pair of identical split photometric sensors, the magnification of the photometric optical system is changed, and the photometric optical systems are set in a defocused state, so as to ensure that the combined photometric sensitivity characteristic becomes smooth from the center toward the periphery of the image plane. The arrangement may be modified such that, by using a pair of split photometric sensors having similar figures respectively corresponding in size to wide and narrow photometric frames shown in FIG. 2, the magnifications of the photometric optical systems are set to be identical. To obtain the defocused state, the image may be formed at a position farther from the light receiving surface of the split photometric sensor. Alternatively, the image may be defocused or distorted by lowering the image forming performance of the image forming lens of the photometric optical system so as to provide aberrations, or by other similar means.

In addition, although two split photometric sensors are used in the illustrated embodiment, three or more split photometric sensors may be used. The configuration of the photometric optical system is not limited to the one illustrated in the embodiment, and the number of divisions, arrangement, and shape of the split photometric regions of the split photometric sensor are not limited to those of the illustrated embodiment.

What is claimed is:

1. A photometric device comprising:

at least two split photometric sensors each having split photometric regions separated by a nonsensitive region; and photometric optical systems for forming subject images on said split photometric sensors, respectively;

wherein the subject image formed on the split photometric regions of one of said sensors is partially overlapped with the subject image formed on the split photometric regions of the other one of said sensors.

2. The photometric device according to claim 1, wherein a combined photometric sensitivity distribution obtained using said split photometric sensors changes smoothly from a center of a subject region toward a periphery thereof.

3. The photometric device according to claim 1, wherein said split photometric sensors are identical to each other, and magnifications of said photometric optical systems are different from each other.

4. The photometric device according to claim 1, wherein each of said split photometric sensors has at least a central photometric region and a peripheral photometric region separated from the central photometric region by the nonsensitive region, and an area photometrically measured by the central photometric region of one of said split photometric sensors includes an area photometrically measured by the central photometric region of the other one of said split photometric sensors, and is included by an area photometrically measured by the peripheral region of the other split photometric sensors, and the peripheral photometric region of said one of said split photometric sensors includes the peripheral photometric region of said the other one of said split photometric sensors.

5. The photometric device according to claim 1, wherein said split photometric sensors are in the form of such similar figures as to have the plurality of similar split photometric regions separated in a direction from a center toward a periphery by the nonsensitive region.

6. The photometric device according to claim 1, wherein said photometric device is mounted on a single reflex camera, and an image on a focusing screen is focussed by said photometric optical systems at positions offset from the photometric regions of said split photometric sensors.

7. The photometric device according to claim 1, the subject image formed on the nonsensitive region of one of said sensor is at least partially measured photometrically by said photometric regions of the other one of said sensor, and the subject image formed on the nonsensitive region of the other one of said sensor is at least partially measured photometrically by said photometric regions of one of said sensor.

* * * * *